Oct. 4, 1949.

F. DE MARINIS 2,483,996

METHOD OF RECONDITIONING BACKING MEMBERS
HAVING POWDERED MATERIAL FACINGS
Filed June 2, 1944

INVENTOR.
Frank DeMarinis
BY
ATTYS.

Patented Oct. 4, 1949

2,483,996

UNITED STATES PATENT OFFICE 2,483,996

METHOD OF RECONDITIONING BACKING MEMBERS HAVING POWDERED MATERIAL FACINGS

Frank De Marinis, Cleveland Heights, Ohio, assignor to The S. K. Wellman Company, Cleveland, Ohio, a corporation of Ohio Application June 2, 1944, Serial No. 538,414

2 Claims. (Cl. 204—29)

This invention relates to the method of reconditioning or reclaiming rejected, discarded or imperfect discs, plates or cores having powdered material bonded thereon for use in brakes, friction clutches, thrust washers, bearings, and the like.

One of the objects of the invention is the provision of a new and improved method of removing defective facing material sintered and bonded in position, from cores, plates and discs of steel or other ferrous material.

Another object of the invention is the provision of a new and improved method of treating discs, plates or other backing members having defective powdered material sintered and bonded thereon, in such manner that they may be reconditioned and rendered adaptable for their intended use.

A further object of the invention is the provision of a new and improved method of chemically removing powdered metal bonded to metallic cores, and backing members, without injuring them, and with a minimum amount of time, expense and loss of material.

A further object of the invention is the provision of a method for removing bonded facing material from rejected friction plates, thrust washers, bearings, and the like, and applying new material thereto; that is efficient in practice; easily performed; and a method that may be practiced with a minimum of expense, effort and materials.

Figure 1:
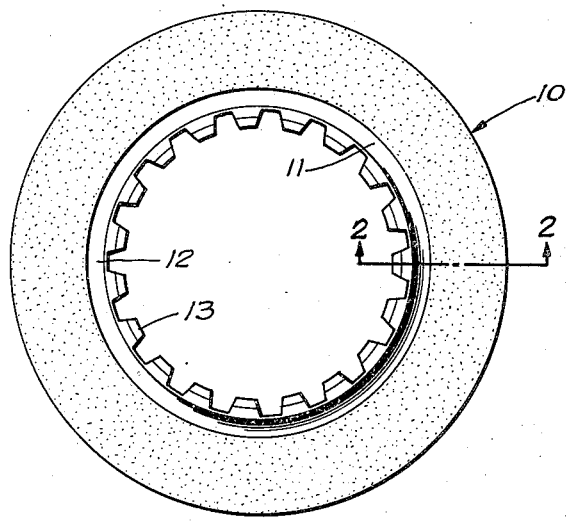
Figure 2:
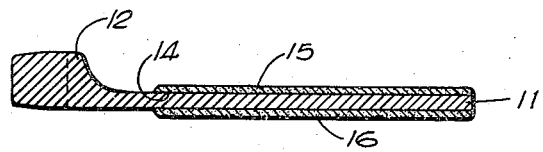

Other and further objects and advantages of the invention will appear from the following description, taken in connection with the accompanying drawings, in which Fig. 1 is a plan view of a friction disc after it has been reconditioned; and Fig. 2 is a section on the line 2—2, on an enlarged scale.

Powdered material has come to be employed very extensively as facings sintered and bonded on friction discs, thrust washers, clutch plates, and for oilless or self-oiling bearings, and the like. Certain steps in the present process are applicable for removing the facing material from the cores or backing members of all such articles that have facing material comprising what will be termed a copper base; that is, where powdered copper constitutes the major portion of the mixture of powdered material of the facing before the same is sintered and bonded onto the discs, plates, cores, or backing members. It is possible that where powdered zinc, copper, tin and lead are employed in the facing material more or less brass or bronze may be formed in the sintering of the material, but for simplicity of description the facing material will be regarded as having a copper base, because of the preponderance of copper in the original powdered mixture.

For the purpose of disclosure the following description is confined principally to friction plates and friction discs, but this is by way of example only and is not intended as a limitation except as restricted by the prior art.

In the manufacture of certain types of friction discs, and other backing members, by sintering and bonding powdered material to cores of steel, and the like, employed in brakes, friction clutches, and similar devices for use on certain types of construction, as, for instance, in airplanes and like uses, the manufacturing clearances or tolerances are very close or exacting, and consequently the rejects are comparatively high. The financial loss has heretofore been considerable for the reason that all attempts to salvage any part of the rejected manufactured material, except as scrap, has been unsuccessful or impractical.

The steel plates, discs or cores used in powdered metal friction discs, in certain types of friction clutches, are made with a very high degree of accuracy, and require from sixty to eighty operations in their preparation. Hence it is important, in such costly structures, that these cores be reclaimed when the finished article is rejected, solely because of defects in the friction material. The first step in reclaiming the cores of a defective powdered metal friction plate or disc is to remove the sintered powdered metal from the core. The next step is to prepare the surface of the core for the attachment of the fresh powdered friction material in preparation for the final step of bonding this friction material to the core.

Removing the facings or sintered friction material from the core has proven to be extremely difficult. Attempts to remove this material from the steel core of these brake and friction discs or plates by grinding is not satisfactory, because of the wear on the grinders as the sintered powdered metal abrades them almost as much as the grinder abrades the material, and for the further reason that the likelihood of abrading the cores and rendering them unfit for reuse, because of lack of uniformity in thickness as a result of these abraded portions, is ever present.

Since the cores involved in this invention are of ferrous material, most of the common acids may not be used for removing these facings therefrom, because these acids attack the steel core, rendering the same non-uniform in thickness, which would render it unfit for reuse as a core for such structures. Furthermore, the facing material, although it may have been subjected to great pressure in the process of forming this material, is more or less porous, and even though the exposed portions of the core on which the facing material is bonded, may be protected against the action of the acid by wax, or the like, yet if acid be used for removing the facing material the acid will penetrate this porous material and attack the steel core, thereby rendering it unfit for reuse.

If the material is to be removed chemically it must be by a treatment that will not materially affect the steel core, and at the same time employ a solvent for one or more of the constituent elements of the sintered material. The treatment must necessarily be such that after one or more of the constituent parts of the facing material is dissolved the residue will be left in such condition that it may be washed or easily scraped from the core, instead of in the form of a lattice or lacework rigidly attached to the core. For instance, the lead constituent of the sintered powdered material could be dissolved out by the use of acetic acid, and numerous experiments along this line were made; but the result was unsatisfactory because the remainder of the material could not be successfully removed by scraping, brushing or rubbing.

In practically all classes of work the core of ferrous material on which the powdered material is bonded must be of uniform thickness throughout, and in certain types of discs the thickness of the core must be accurate to within a few thousandths of an inch. As a result of such close tolerances, and in order not to affect the core, extreme care must be exercised in removing the powdered material from the latter, whether it is to be removed either by abrasion or by chemical means.

After a careful study of methods for stripping friction material from these cores, and after numerous laboratory experiments were made, a method was developed for successfully removing facing members of sintered friction material from cores, plates and discs of ferrous material without injuring the same or rendering them unfit for reuse.

In order that the method of reconditioning the rejected friction discs shall be commercially practicable, the present invention seeks not only to recover the discs or plates to which the facing formed from powdered material is bonded, but to remove the material in such manner that it, or certain parts thereof, will be in condition for reuse in some of the steps in connection with the process of manufacturing friction discs and plates.

It was found by experiment that when the facing has a copper base the material could be removed by pickling or soaking the discs or plates in a sodium cyanide solution for a period of time, depending on the thickness of the bonded material. The dissolution of copper from the matrix of the sintered facing is accomplished without the use of current. It is a result of the action of many minute galvanic cells existing in the heterogeneous mixture of metals and alloys, such as a typical composition indicates. This process takes advantage of this principle and thus eliminates the expense of buying equipment to supply a source of direct current and the cost of the current itself. While ferrocyanide and ferricyanide compositions are known chemical compounds, conditions are not sufficient for their formation in this process, and the ferrous cores are, therefore, substantially unaffected.

For instance, where the powdered material had the following composition—

| | Per cent |
|---|---|
| Copper (Cu) | 67.25 |
| Tin (Sn) | 5.31 |
| Lead (Pb) | 8.72 |
| Iron (Fe) | 7.2 |
| Carbon (C) | 7.08 |
| Silica ($SiO_2$) | 4.42 | sintered and bonded on both sides of a steel plate somewhere around 1/64" in thickness to an overall thickness of the friction member of possibly 3/32", it was found that a 10% to 20% solution by weight of sodium cyanide (NaCN) would loosen up the material in about five or six days at room temperature, so that the residue of the sintered friction material could be readily brushed or scraped off the core. In other words, the reaction was substantially complete in about that time. The time required for the reaction to be complete will depend on the thickness of the material to be removed. The chemical reaction may be speeded up by brushing the discs to remove the reaction products therefrom at frequent intervals. It was also found that a solution materially less than 10% required too great a time to complete the reaction, and that above 20% the reaction was not materially hastened.

The composition given above is typical for a mixture constituting a friction surface when sintered and bonded on a backing member. By omitting the silica the same mixture may be employed as an oilless bearing.

Where the facings are removed by the use of sodium cyanide, it was found that in bonding fresh powdered material to the reclaimed cores the faces of those cores must be retreated to prevent oxidation at high temperatures, the same as new, fresh or unused cores. This may be accomplished as in the original application, except that the spent cyanide solution may be employed as an electrolyte for copper coating or plating the faces of the cores by the electrolytic process.

The copper content of the facing material of each sample tested had around 223 grams, and the original cyanide solution contained 498 grams of sodium cyanide (NaCN) and gave a final analysis of 210 grams of copper. This indicates that the complex or double salt $Na_2Cu(CN)_3$ was formed rather than sodium cuprocyanide ($NaCu(CN)_2$). It was found that it is necessary to have in the solution sufficient sodium cyanide to combine with the copper to form this double or complex salt, and an excess known as free cyanide. The free cyanide in the solution is used to replace the cyanide which decomposes and oxidizes to form sodium carbonate.

After the protective coating is applied the facing material is sintered and bonded onto the core and the reconditioned friction member is complete, as shown in the drawing, in which the reference character 10 designates a friction disc comprising the core 11, having the hub portion 12 provided with inwardly extending interlocking splines or teeth 13. These teeth or splines are adapted to interlock with corresponding teeth or splines on a cooperating member for preventing relative rotation of the disc and such member. The core 11 may be of steel or other material not affected by sodium cyanide, and on which facing material having a copper base may be bonded. In order that the powdered metallic friction material may be bonded thereto the surface is provided with a protective coat 14 of suitable material, after which the friction material 15, 16, is sintered and bonded onto the disc or steel core 11, in the usual manner.

Where the facing material has a copper base, the protective coat 14 is preferably of copper and applied preferably by the electrolytic process. This coat of copper is almost imperceptible, being only sufficient to cause the facing material to be bonded to the facing support. The protective coat and facing or friction material may be applied in any approved manner, as, for instance, disclosed in patents to Swartz, Reissue No. 22,282, March 2, 1943, and Wellman, No. 2,178,527, Oct. 21, 1939.

It will thus be seen that friction discs having imperfect facings may be reconditioned by first removing the friction material by immersing the rejected discs in a solution of sodium cyanide for a period of several days, or until the reaction is substantially complete, and then scraping and brushing the spongy-like material from the disc; thoroughly cleaning the surfaces of the disc, electroplating the same by using the spent cyanide solution as an electrolyte, and finally reapplying or sintering and bonding friction material having a copper base on one or both of said surfaces to complete the friction disc, as shown in the drawing.

It was found by experiment that it is not absolutely essential that all the old friction material be removed from the core preparatory to electroplating the same, in order to obtain a good bond for the application of the facing material. The tin and lead may be recovered from the sludge and used over again as a constituent of the powdered material, if desired.

While the process is described as applied to reconditioning defective friction discs and clutch plates having facings of what has been termed a copper base, it is to be understood that such facings may be removed from other discs, plates, backing members, cores or supports useful in other relations where it is desired to remove such facings, whether new ones are to be reapplied or not.

It is thought from the foregoing, taken in connection with the accompanying drawing, that the operation and construction of my device will be apparent to those skilled in the art, and that changes in size, shape, proportion and details may be made without departing from the spirit and scope of the appended claims.

I claim as my invention:

1. A method of reconditioning backing members of ferrous material which are copper plated and have bonded thereto layers of defective sintered powdered metal mixtures having copper as their major constituent and comprising also essentially tin, lead, iron, carbon and silica, which comprises chemically treating said members in a 10% to 20% solution of sodium cyanide without the use of electric current, thereby dissolving the copper only and reducing the layers to a residue of loosely attached material, then mechanically removing said residue, and electroplating with copper the members in the solution thus obtained.

2. A method of reconditioning backing members of ferrous material which are copper plated and have bonded thereto layers of defective sintered powdered metal mixtures having copper as their major constituent and comprising also essentially tin, lead, iron and carbon, which comprises chemically treating said members in a 10% to 20% solution of sodium cyanide without the use of electric current, thereby dissolving the copper only and reducing the layers to a residue of loosely attached material, then mechanically removing said residue, and electroplating with copper the members in the solution thus obtained.

FRANK DE MARINIS.

REFERENCES CITED

The following references are of record in the file of this patent:

UNITED STATES PATENTS

| Number | Name | Date |
| --- | --- | --- |
| Re. 22,282 | Swartz | Mar. 2, 1943 |
| 699,108 | Hunt | Apr. 29, 1902 |
| 925,321 | Fisher | June 15, 1909 |
| 1,050,678 | Moreno | Jan. 14, 1913 |
| 1,774,901 | Piersol | Sept. 2, 1930 |
| 1,787,139 | Cain | Dec. 30, 1930 |
| 1,798,607 | Kardos | Mar. 31, 1931 |
| 1,818,379 | Cain et al. | Aug. 11, 1931 |
| 2,241,585 | Day | May 13, 1941 |
| 2,284,743 | Kawecki | June 2, 1942 |
| 2,287,654 | Wernlund | June 23, 1942 |
| 2,316,579 | Hall | Apr. 13, 1943 |

OTHER REFERENCES

Metal Cleaning and Polishing, November 1933, pages 464, 465, 466, and 475.

Principles of Electroplating and Electroforming, by William Blum and George B. Hogaboom, 2nd edition, 1930, page 360.